(12) United States Patent
Kikuchi

(10) Patent No.: US 10,321,041 B2
(45) Date of Patent: Jun. 11, 2019

(54) IMAGING APPARATUS, CONTROL METHOD OF IMAGING APPARATUS, AND NON-TRANSITORY STORAGE MEDIUM STORING CONTROL METHOD OF IMAGING APPARATUS

(71) Applicant: OLYMPUS CORPORATION, Hachioji-shi, Tokyo (JP)

(72) Inventor: Tetsuo Kikuchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 143 days.

(21) Appl. No.: 15/435,439

(22) Filed: Feb. 17, 2017

(65) Prior Publication Data

US 2017/0244888 A1 Aug. 24, 2017

(30) Foreign Application Priority Data

Feb. 18, 2016 (JP) .................................. 2016-028652

(51) Int. Cl.
*H04N 5/232* (2006.01)
*H04N 5/238* (2006.01)

(52) U.S. Cl.
CPC ......... *H04N 5/23212* (2013.01); *H04N 5/238* (2013.01); *H04N 5/23293* (2013.01)

(58) Field of Classification Search
CPC ........... H04N 5/23212; H04N 5/23293; H04N 5/2353; H04N 5/238; G03B 7/00
See application file for complete search history.

(56) References Cited

U.S. PATENT DOCUMENTS

| 2002/0196348 | A1* | 12/2002 | Kubo | H04N 5/772 348/220.1 |
| 2006/0198620 | A1* | 9/2006 | Watanabe | A61B 1/045 396/17 |
| 2006/0238623 | A1* | 10/2006 | Ogawa | H04N 1/2112 348/220.1 |
| 2006/0256203 | A1* | 11/2006 | Honma | H04N 5/232 348/220.1 |
| 2006/0264733 | A1* | 11/2006 | Masaki | H04N 5/232 600/407 |

(Continued)

FOREIGN PATENT DOCUMENTS

| JP | 59-220709 | 12/1984 |
| JP | 2002-296486 | 10/2002 |

*Primary Examiner* — Abdelaaziz Tissire
(74) *Attorney, Agent, or Firm* — John C. Pokotylo; Pokotylo Patent Services

(57) ABSTRACT

An imaging apparatus includes a photographic lens, an imager, a diaphragm, a drive unit, and a control unit. The imager receives light fluxes passing through the photographic lens to generate an imaging signal. The diaphragm regulates the light fluxes passing through the photographic lens and received by the imager. The drive unit drives the diaphragm. The control unit performs still image continuous photography and displays a live-view image on a display unit during each main exposure of the still image continuous photography. The control unit controls a start timing of the driving of the diaphragm for the main exposure performed by the drive unit while the live-view image is displayed during each main exposure of the still image continuous photography, in accordance with a drive speed of the diaphragm.

16 Claims, 13 Drawing Sheets

(56) References Cited

U.S. PATENT DOCUMENTS

| | | | | |
|---|---|---|---|---|
| 2008/0267608 | A1* | 10/2008 | Kubota | H04N 5/232 |
| | | | | 396/374 |
| 2009/0284612 | A1* | 11/2009 | Abe | G03B 7/085 |
| | | | | 348/221.1 |
| 2009/0290862 | A1* | 11/2009 | Shibuno | G03B 7/093 |
| | | | | 396/246 |
| 2010/0220989 | A1* | 9/2010 | Hashigami | G03B 7/085 |
| | | | | 396/257 |
| 2010/0284679 | A1* | 11/2010 | Mizukami | G03B 7/08 |
| | | | | 396/257 |
| 2011/0013093 | A1* | 1/2011 | Yamamoto | H04N 5/335 |
| | | | | 348/739 |
| 2011/0090393 | A1* | 4/2011 | Kawarada | H04N 5/23209 |
| | | | | 348/345 |
| 2011/0298954 | A1* | 12/2011 | Nakaseko | H04N 5/343 |
| | | | | 348/296 |
| 2014/0333819 | A1* | 11/2014 | Aoki | G03B 13/06 |
| | | | | 348/333.09 |

\* cited by examiner

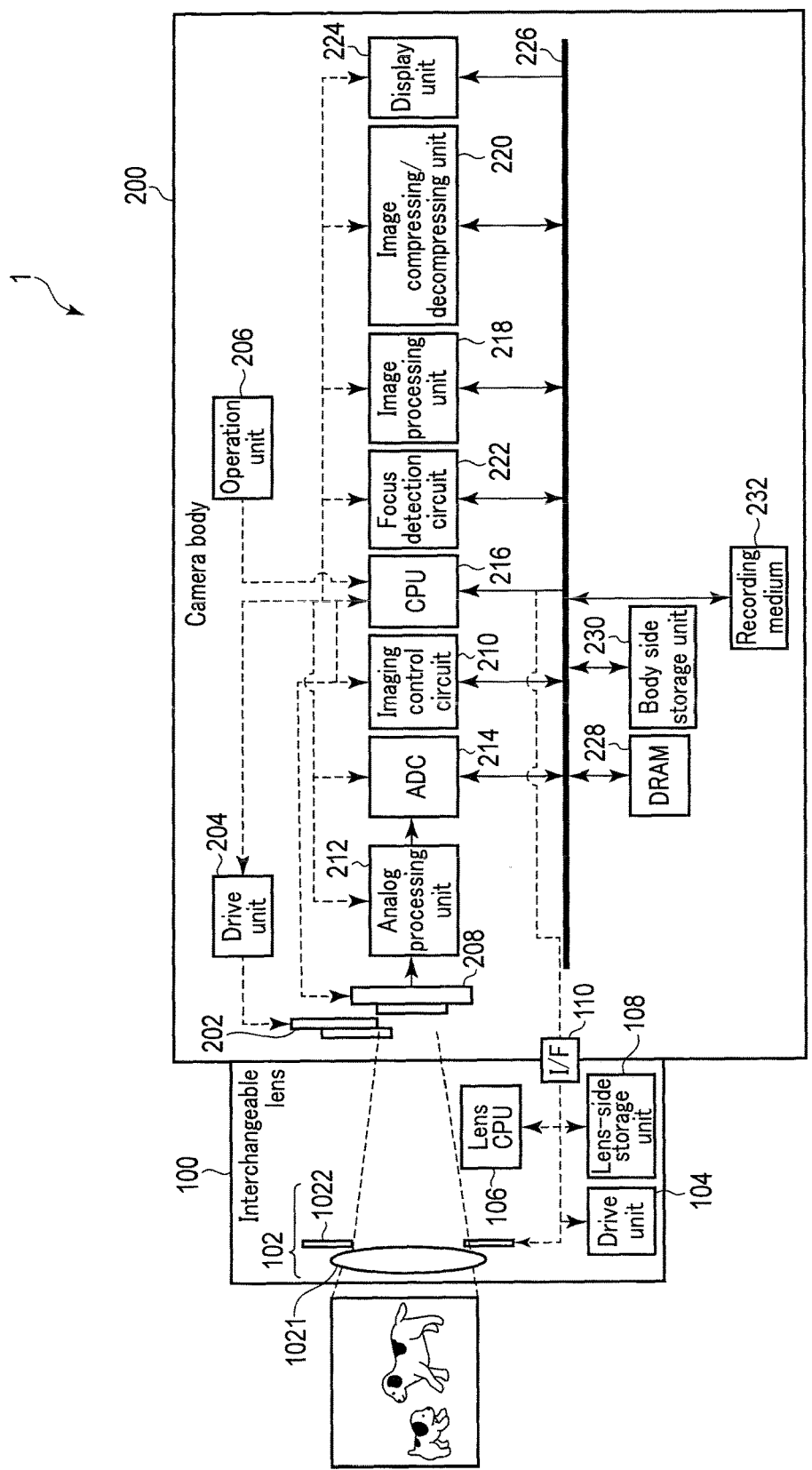
F I G. 1

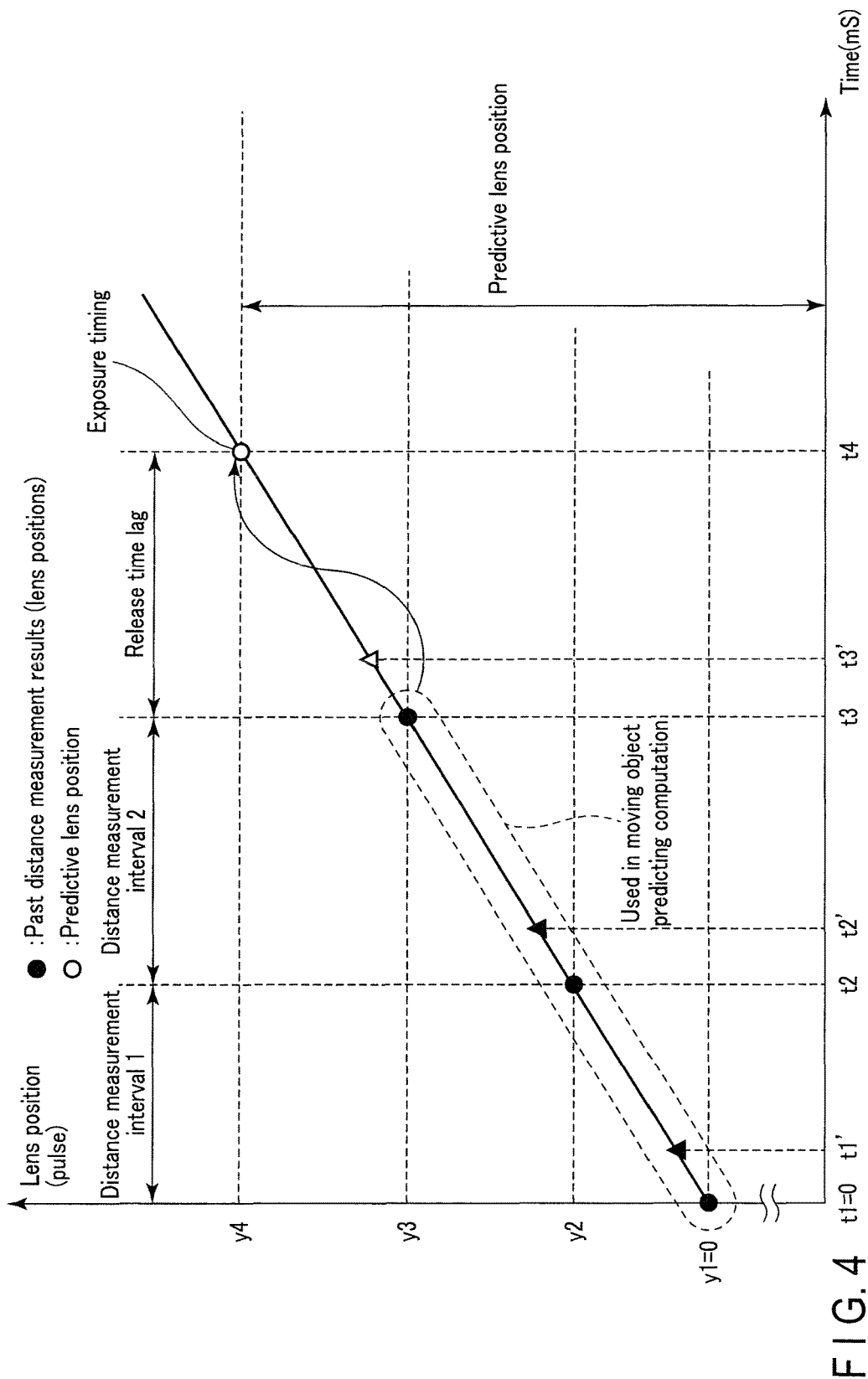
F I G. 4

| Lens types | Number of LV acquired frames | Image display time | Image loss ratio |
|---|---|---|---|
| Lens incapable of diaphragm high-speed driving | 3 | 25 | 75% |
| Lens capable of diaphragm high-speed driving | 4 | 33.33333333 | 67% |

FIG. 5

| Lens-side compatible cycle frequency | Focus lens driving time (body-side holding table) |
|---|---|
| 240fps | 30ms |
| 120fps | 40ms |
| 60fps | 50ms |

FIG. 6

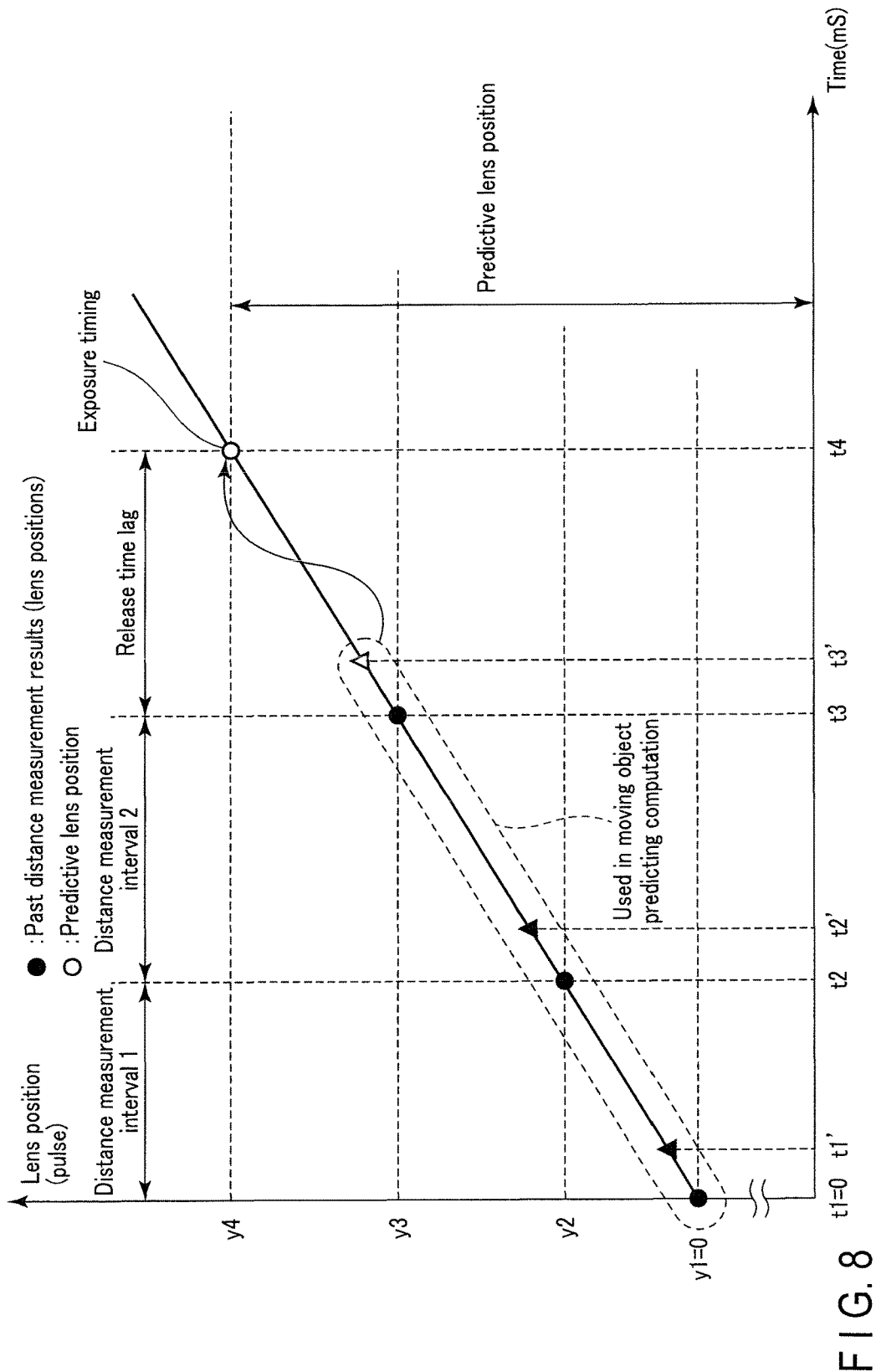
F I G. 8

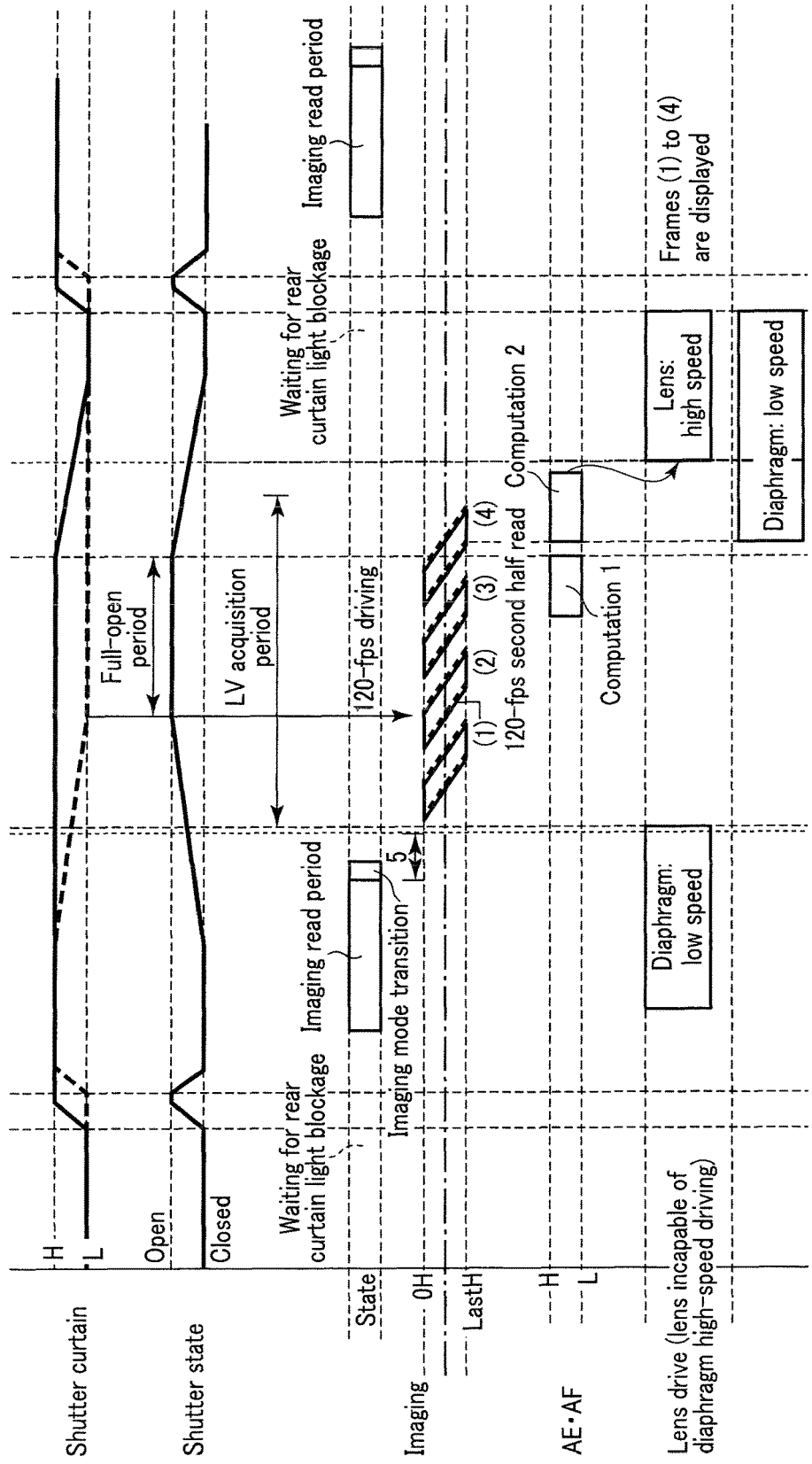
F I G. 10

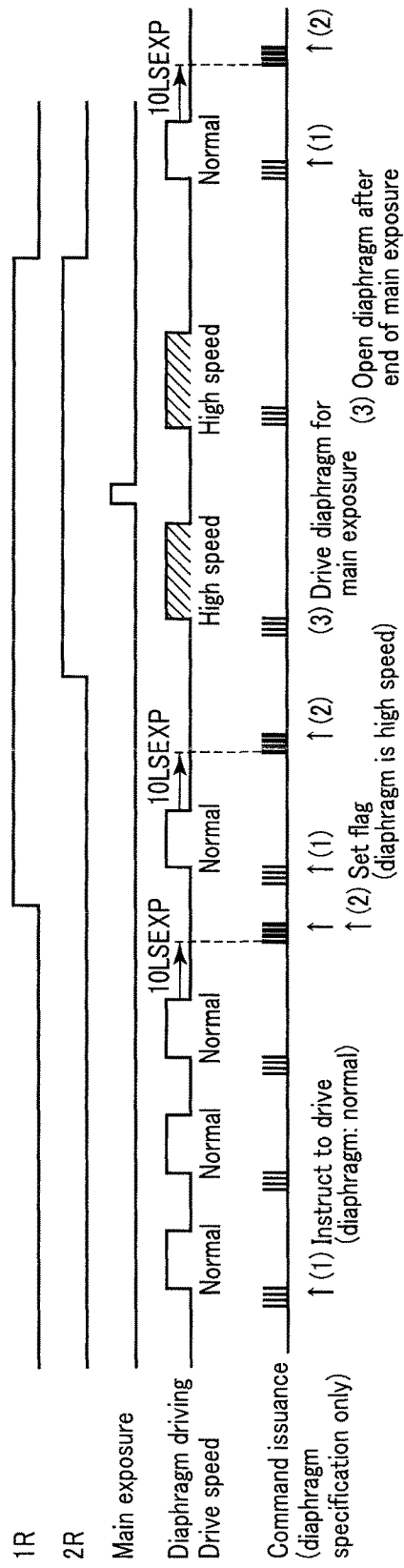
F I G. 12

IMAGING APPARATUS, CONTROL METHOD OF IMAGING APPARATUS, AND NON-TRANSITORY STORAGE MEDIUM STORING CONTROL METHOD OF IMAGING APPARATUS

CROSS-REFERENCE TO RELATED APPLICATIONS

This application is based upon and claims the benefit of priority from the prior Japanese Patent Application No. 2016-028652, filed Feb. 18, 2016, the entire contents of which are incorporated herein by reference.

BACKGROUND OF THE INVENTION

1. Field of the Invention

The present invention relates to an imaging apparatus, a control method of an imaging apparatus, and a non-transitory storage medium storing a control method of an imaging apparatus.

2. Description of the Related Art

Jpn. Pat. Appln. KOKAI Publication No. 2002-296486 and Jpn. Pat. Appln. KOKAI Publication No. 59-220709 suggest techniques to change the drive speed of a focus lens during an autofocus (AF) operation. These techniques can reduce the time of AF on a low-contrast and low-luminance subject. This permits the reduction of a release time lag.

BRIEF SUMMARY OF THE INVENTION

According to a first aspect of the invention, there is provided an imaging apparatus comprising: a photographic lens; an imager which receives light fluxes passing through the photographic lens to generate an imaging signal; a diaphragm which regulates the light fluxes passing through the photographic lens and received by the imager; a drive unit which drives the diaphragm; and a control unit which performs still image continuous photography and which displays a live-view image on a display unit during each main exposure of the still image continuous photography, wherein the control unit controls, in accordance with a drive speed of the diaphragm, a start timing of the driving of the diaphragm for the main exposure performed by the drive unit while the live-view image is displayed during each main exposure of the still image continuous photography.

According to a second aspect of the invention, there is provided a control method of an imaging apparatus, the imaging apparatus comprising a photographic lens, an imager which receives light fluxes passing through the photographic lens to generate an imaging signal, a diaphragm which regulates the light fluxes passing through the photographic lens and received by the imager, and a display unit which displays on the basis of the imaging signal, the control method comprising: performing still image continuous photography by the imager, and displaying a live-view image on the display unit during each main exposure of the still image continuous photography; and controlling, in accordance with a movement speed of the diaphragm, a start timing of the movement of the diaphragm for the main exposure while the live-view image is displayed during each main exposure of the still image continuous photography.

According to a third aspect of the invention, there is provided a non-transitory computer-readable medium storing a processor executable code, which when executed by at least one processor, performs a control method of an imaging apparatus comprising a photographic lens, an imager which receives light fluxes passing through the photographic lens to generate an imaging signal, a diaphragm which regulates the light fluxes passing through the photographic lens and received by the imager, and a display unit which displays on the basis of the imaging signal, the control method comprising: performing still image continuous photography by the imager, and displaying a live-view image on the display unit during each main exposure of the still image continuous photography; and controlling, in accordance with a movement speed of the diaphragm, a start timing of the movement of the diaphragm for the main exposure while the live-view image is displayed during each main exposure of the still image continuous photography.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the configuration of one example of a camera system as an example of an imaging apparatus according to one embodiment of the present invention;

FIG. 4 is a graph illustrating a moving object predicting computation;

FIG. 5 is a table showing, by comparison, image loss ratios in a diaphragm capable of high-speed driving and a diaphragm incapable of high-speed driving in the example of FIG. 3;

FIG. 6 is a table showing an example of the association of the drive speed of the focus lens and the cycle frequency of the focus lens;

FIG. 8 is a graph illustrating a moving object predicting computation in the case where the drive speeds of the focus lens and the diaphragm are high enough;

FIG. 10 is a timing chart of the still image continuous photography operation in action in a second half read mode;

FIG. 12 is a diagram illustrating processing in steps S22 to S26.

DETAILED DESCRIPTION OF THE INVENTION

Figure 2A:
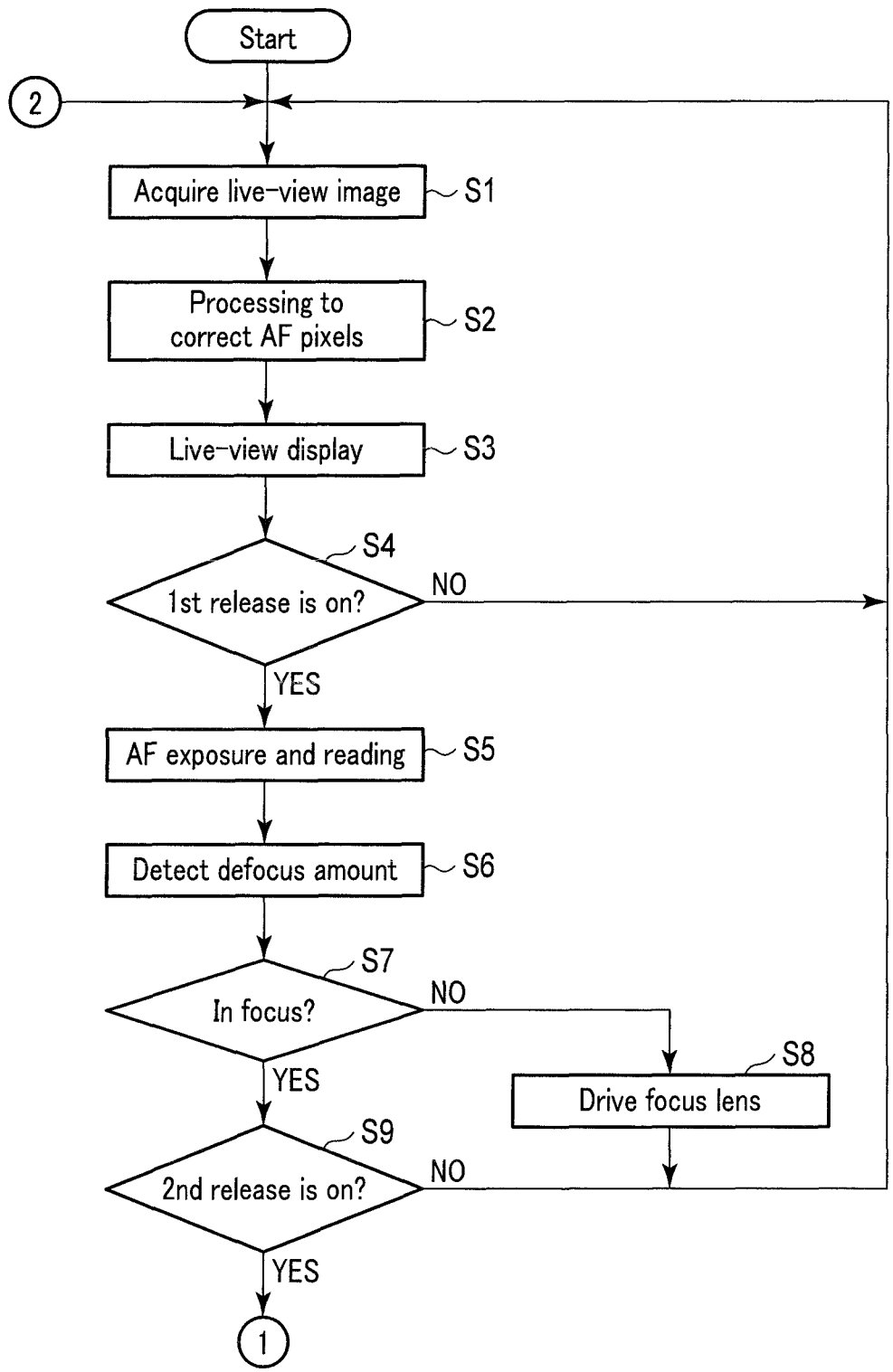
FIG. 2A is a flowchart showing a still image continuous photography operation.

Hereinafter, an embodiment of the present invention will be described with reference to the drawings. FIG. 1 is a block diagram showing the configuration of one example of a camera system as an example of an imaging apparatus according to one embodiment of the present invention. Here, in FIG. 1, solid lines with arrows indicate the flow of data, and broken lines with arrows indicate the flow of control signals.

A camera system 1 shown in FIG. 1 has an interchangeable lens 100 and a camera body 200. The interchangeable lens 100 is configured to be attached to and detached from the camera body 200. When the interchangeable lens 100 is attached to the camera body 200, the interchangeable lens 100 is connected to the camera body 200 in communication with each other. The camera system 1 does not necessarily have to be a lens-interchangeable camera system. For example, the camera system 1 may be a lens-integrated camera system.

The interchangeable lens 100 as a lens unit includes a photographic lens 102, a drive unit 104, a lens CPU 106, and a lens-side storage unit 108.

The photographic lens 102 is an optical system to form subject light fluxes into an image on an imager 208 of the camera body 200. The photographic lens 102 includes a focus lens 1021 and a diaphragm 1022. The focus lens 1021 is configured to adjust the focal position of the photographic lens 102 by moving in an optical axis direction. The diaphragm 1022 is disposed on the optical axis of the focus lens 1021, and has its aperture that is configured to be variable. The diaphragm 1022 regulates the subject light fluxes passing through the focus lens 1021 and then entering the imager 208. The drive unit 104 drives the focus lens 1021 and the diaphragm 1022 on the basis of a control signal from the lens CPU 106. Here, the photographic lens 102 may be configured as a zoom lens. In this case, the drive unit 104 also performs zoom drive.

The lens CPU 106 is configured to be in communication with a CPU 216 of the camera body 200 via an interface (I/F) 110 a lens communication unit. This lens CPU 106 has a function as a focus control unit, and controls the drive unit 104 under the control of the CPU 216. The lens CPU 106 also sends information such as an aperture value (F value) of the diaphragm 1022 and lens information stored in the lens-side storage unit 108 to the CPU 216 via the I/F 110.

The lens-side storage unit 108 stores the lens information regarding the interchangeable lens 100. The lens information includes, for example, information on the focal distance of the photographic lens 102 and information on aberration. Moreover, in the present embodiment, the lens information includes information on the drive speed of the diaphragm 1022. The information on the drive speed of the diaphragm 1022 is information indicating whether the diaphragm is capable of high-speed driving. The diaphragm capable of high-speed driving here means a diaphragm which can complete driving up to a predetermined aperture amount earlier than a predetermined time. Such information on the drive speed of the diaphragm 1022 is managed by, for example, a 1-bit flag. This flag is, for example, "0" in the case of the diaphragm incapable of high-speed driving, and "1" in the case of the diaphragm capable of high-speed driving.

The camera body 200 includes a mechanical shutter 202, a drive unit 204, an operation unit 206, the imager 208, an imaging control circuit 210, an analog processing unit 212, an analog/digital converter (ADC) 214, the CPU 216, an image processing unit 218, an image compressing/decompressing unit 220, a focus detection circuit 222, a display unit 224, a bus 226, a DRAM 228, a body side storage unit 230, and a recording medium 232.

The mechanical shutter 202 is configured to be openable and closable, and adjusts the entrance time of the subject light fluxes into the imager 208 from the subject (the exposure time of the imager 208). For example, a focal plane shutter is employed as the mechanical shutter 202. The drive unit 204 drives the mechanical shutter 202 on the basis of a control signal from the CPU 216.

The operation unit 206 includes various operational buttons such as an electric power supply button, a release button, a moving image button, a reproduction button, and a menu button, and various operation components such as a touch panel. The operation unit 206 detects the operation states of the various operation components, and outputs a signal indicating a detection result to the CPU 216.

The imager 208 is disposed on the optical axis of the photographic lens 102, in the rear of the mechanical shutter 202, and at a position where the subject light fluxes are formed into an image by the photographic lens 102. The imager 208 is configured so that light receiving portions (e.g. photodiodes) constituting pixels are two-dimensionally arranged. The light receiving portions that constitute the imager 208 generate a charge corresponding to a light receiving amount. The charge generated in the light receiving portions is stored in a capacitor connected to each of the light receiving portions. The charge stored in this capacitor is read as an imaging signal in accordance with a control signal from the imaging control circuit 210. Here, the imager 208 may include focus detecting pixels.

The imaging control circuit 210 controls the exposure of the imager 208 and the reading of the imaging signals from the imager 208 in accordance with the setting of the reading of the imaging signals from the imager 208.

The analog processing unit 212 performs analog processing such as amplification processing for the imaging signals read from the imager 208 under the control of the imaging control circuit 210. The ADC 214 converts the imaging signal output from the analog processing unit 212 into pixel data in a digital format. In the following explanation, a collection of pixel data is referred to as image data.

The CPU 216 is a control unit which controls the whole camera system 1 in accordance with a program stored in the body side storage unit 230.

The image processing unit 218 subjects the image data to various kinds of image processing. For example, to record a still image, the image processing unit 218 subjects the image data to image processing for still image recording. Similarly, to record a moving image, the image processing unit 218 subjects the image data to image processing for moving image recording. Moreover, at the time of live-view display, the image processing unit 218 subjects the image data to image processing for display.

At the time of recording of the image data, the image compressing/decompressing unit 220 compresses image data (still image data or moving image data) generated in the image processing unit 218. At the time of reproduction of the image data, the image compressing/decompressing unit 220 decompresses the image data recorded in the recording medium 232 in a compressed state.

The focus detection circuit 222 performs defocus amount computation to calculate a defocus direction and a defocus amount with regard to the in-focus position of the focus lens 1021. When the imager 208 is provided with focus detection pixels, the focus detection circuit 222 acquires pixel data from the focus detection pixels, and calculates a defocus direction and a defocus amount with regard to the in-focus position of the focus lens 1021 by use of a known phase difference method on the basis of the acquired pixel data. The focus detection circuit 222 then calculates a lens position to which the focus lens 1021 is to be driven on the basis of the defocus direction and the defocus amount. The explanation is provided below on the assumption that the focus detection circuit 222 detects the defocus direction and the defocus amount by use of a phase difference method using the focus detection pixels. However, the focus detection circuit 222 may detect the defocus direction and the defocus amount by various methods other than the phase difference method using the focus detection pixels. For example, the focus detection circuit 222 may detect the defocus amount by a contrast method.

The display unit 224 is a display unit such as a liquid crystal display or an organic EL display, and is disposed, for example, on the rear surface of the camera body 200. This display unit 224 displays images under the control of the CPU 216. The display unit 224 is used, for example, for the live-view display or for the display of recorded images.

The bus 226 is connected to the ADC 214, the CPU 216, the image processing unit 218, the image compressing/decompressing unit 220, the focus detection circuit 222, the DRAM 228, the body side storage unit 230, and the recording medium 232, and functions as a transfer path to transfer various kinds of data generated in these blocks.

The DRAM 228 is an electrically rewritable memory, and transitorily stores various kinds of data such as the above-mentioned image data (pixel data), image data for recording, image data for display, and processed data in the CPU 216. An SDRAM may be used for transitory storage.

The body side storage unit 230 stores programs used in the CPU 216, and various kinds of data such as adjustment values of the camera body 200.

The recording medium 232 is configured to be incorporated or loaded in the camera body 200, and records the image data for recording as an image file in a predetermined format.

Figure 2B:
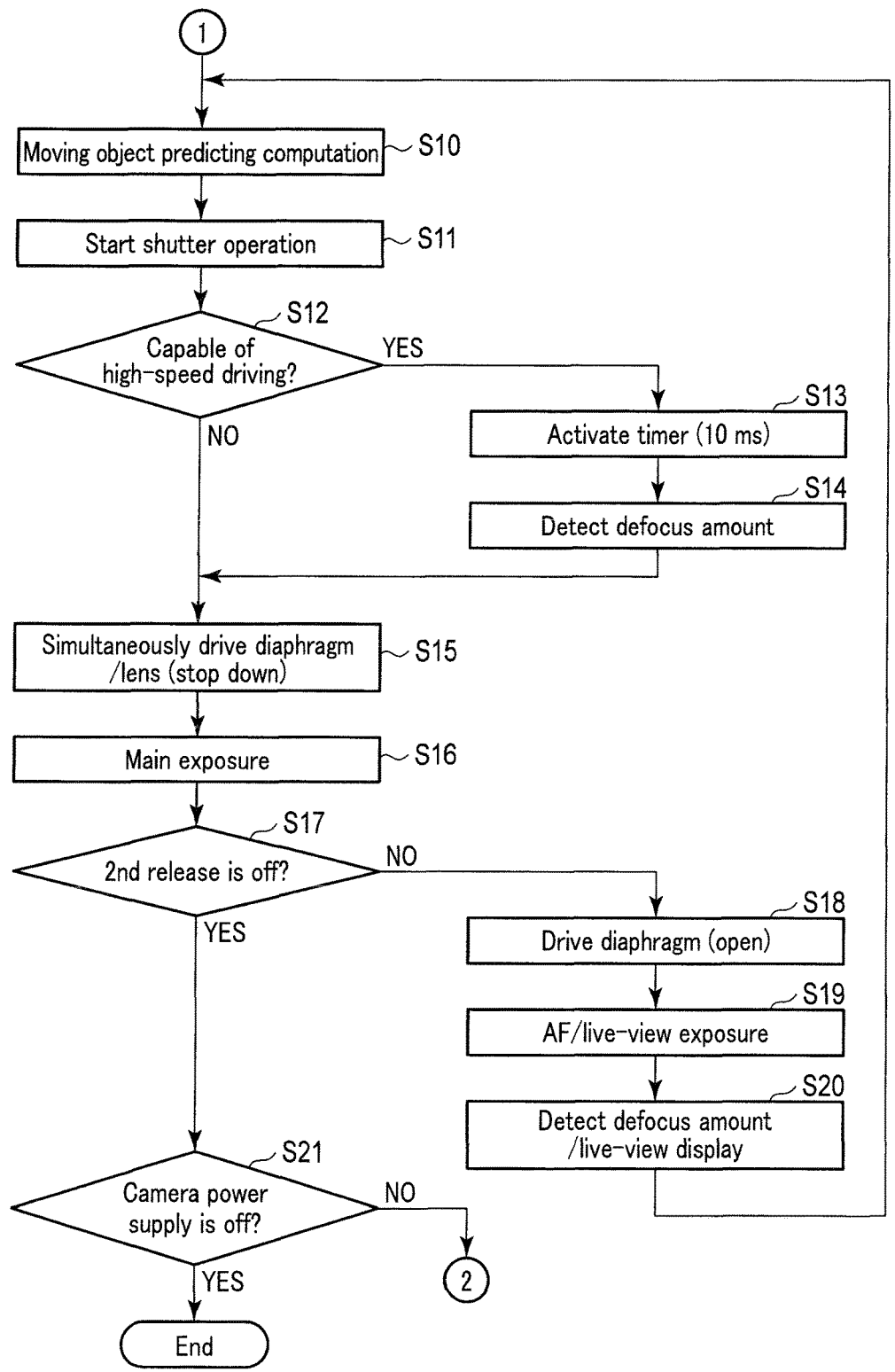
FIG. 2B is a flowchart showing the still image continuous photography operation.

An operation by the camera system 1 according to the present embodiment is described below. FIG. 2A and FIG. 2B are flowcharts showing still image continuous photography operation by the camera system 1. Here, the camera system 1 may be configured to be also capable of photography operations other than the still image continuous photography operation.

Processing in the flowcharts shown in FIG. 2A and FIG. 2B is started, for example, when the power supply of the camera body 200 is turned on. In step S1, the CPU 216 acquires image data for live-view. First, the CPU 216 instructs the lens CPU 106 to switch control signals of the drive unit 204 and drive the diaphragm 1022 so that the mechanical shutter 202 will be fully opened. The CPU 216 then starts an exposure operation for live-view by the imager 208 after the diaphragm 1022 is released and a predetermined time for which the mechanical shutter 202 is fully opened elapses. The frame rate of this exposure operation for live-view is, for example, 60 fps.

In step S2, the image processing unit 218 performs correction processing for the pixel data from the focus detection pixels. As a result of this correction processing, the pixel data from the focus detection pixels can be used in the live-view display in a manner similar to the pixel data from the imaging pixels. After this correction processing, the image processing unit 218 performs other processing necessary for the generation of image data for the live-view display to generate the image data for display.

In step S3, the CPU 216 performs live-view display. That is, the CPU 216 displays live-view images on the display unit 224 on the basis of the image data for display generated in the image processing unit 218.

In step S4, the CPU 216 judges whether a 1st release switch is turned on. The 1st release switch is, for example, a switch which turns on in response to a half-press operation of the release button by a user. When it is judged in step S4 that the 1st release switch is not turned on, the processing returns to step S1. In this case, the live-view display is repeated. When it is judged in step S4 that the 1st release switch is turned on, the processing proceeds to step S5.

In step S5, the CPU 216 acquires image data for AF. In this instance, the CPU 216 starts an exposure operation for AF by the imager 208. The exposure time in the exposure operation for AF may be different from the exposure operation for live-view. In the exposure operation for AF, the imaging signal may be read from the focus detection pixels alone.

In step S6, the focus detection circuit 222 calculates a defocus direction and a defocus amount with regard to the in-focus position of the focus lens 1021 by the known phase difference method using the pixel data acquired from the focus detection pixels.

In step S7, the CPU 216 judges whether the focus lens 1021 is in focus. Whether the focus lens 1021 is in focus is judged, for example, by judging whether the defocus amount is within a predetermined allowable range. When it is not judged in step S7 that the focus lens 1021 is in focus, the processing proceeds to step S8. When it is judged in step S7 that the focus lens 1021 is in focus, the processing proceeds to step S9.

In step S8, the CPU 216 instructs the lens CPU 106 so that the focus lens 1021 is driven in accordance with the defocus direction and the defocus amount. In response to this instruction, the lens CPU 106 drives the focus lens 1021 via the drive unit 104. The processing then returns to step S1.

In step S9, the CPU 216 judges whether a 2nd release switch is turned on. The 2nd release switch is, for example, a switch which turns on in response to a full-press operation of the release button by the user. When it is judged in step S9 that the 2nd release switch is not turned on, the processing returns to step S1. When it is judged in step S9 that the 2nd release switch is turned on, the processing proceeds to step S10.

In step S10, the focus detection circuit 222 starts a moving object predicting computation. The moving object predicting computation is processing to predict a current position to which the focus lens 1021 is to be driven from the history of past distance measurement results (drive positions of the focus lens 1021). After the moving object predicting computation, the processing proceeds to step S11.

In step S11, the CPU 216 starts the operation of the mechanical shutter 202 to perform the main exposure of the still image continuous photography. The operation of this mechanical shutter 202 includes open/close operations of the mechanical shutter 202 before and after the main exposure, and a full-open operation of the mechanical shutter 202 to start the exposure operations for live-view and for AF after the main exposure. The CPU 216 first switches control signals of the drive unit 204 so that the mechanical shutter 202 will be fully closed. After performing the main exposure in step S16, the CPU 216 controls the drive unit 204 so that the mechanical shutter 202 will be fully opened.

In step S12, the CPU 216 judges whether the diaphragm 1022 is a diaphragm capable of high-speed driving by referring to the lens information stored in the lens-side storage unit 108. When it is judged in step S12 that the diaphragm 1022 is a diaphragm capable of high-speed driving, the processing proceeds to step S13. When it is judged in step S12 that the diaphragm 1022 is not a diaphragm capable of high-speed driving, the processing proceeds to step S15.

In step S13, the CPU 216 activates a timer to delay the driving of the focus lens 1021 and the diaphragm 1022. The timer here is, for example, a timer of 10 ms. In step S13, the processing proceeds to step S14 after the activation of the timer. The timer is set at 10 ms because the frame rate of the exposure operation is 120 fps. Although described later in detail, it is possible to perform one additional exposure operation by delaying the driving of the focus lens 1021 and the diaphragm 1022 10 ms if the frame rate of the exposure operation is 120 fps. The setting of the timer can be changed suitably to conditions such as the frame rate of the exposure operation.

In step S14, the focus detection circuit 222 performs the defocus amount computation. As the defocus amount computation, the focus detection circuit 222 calculates a defocus direction and a defocus amount with regard to the in-focus position of the focus lens 1021 by the known phase difference method using, for example, the pixel data which is acquired from the focus detection pixels by the exposure operation for AF. The focus detection circuit 222 then calculates a lens position of the focus lens 1021 to be driven to, on the basis of the calculated defocus direction and defocus amount. An exposure amount for AE may be computed in step S14. As will be described later, the activation of the timer in step S13 is synchronized with predetermined timing of the mechanical shutter operation, so that the order of the defocus amount detection in step S14 may be changed. If the timer activated in step S13 measures 10 ms, the processing proceeds to step S15.

In step S15, the CPU 216 instructs the lens CPU 106 to simultaneously drive the focus lens 1021 and the diaphragm 1022. Here, in step S15, the instruction is issued so that the diaphragm 1022 is driven and stopped down to an aperture amount necessary for the still image continuous photography which is predetermined in the exposure amount computation for AE or the like.

In step S16, the CPU 216 starts the main exposure. The main exposure is an exposure operation to acquire image data for recording. In the main exposure, the CPU 216 controls the drive unit 204 to open and close the mechanical shutter 202 for an exposure period necessary for predetermined the still image continuous photography. The CPU 216 starts the imaging operation of the imager 208 during the exposure period. After the end of the exposure period, the imaging control circuit 210 reads the imaging signal from each pixel of the imager 208. After the imaging signal is read, the image processing unit 218 corrects the pixel output of the focus detection pixels and performs processing to generate other image data for recording. After the completion of the image processing, the image compressing/decompressing unit 220 compresses the image data for recording. After the completion of the compression, the CPU 216 records the compressed image data for recording in the recording medium 232 as an image file.

In step S17, the CPU 216 judges whether the 2nd release switch is turned off by the user. When it is judged in step S17 that the 2nd release switch is not turned off, the processing proceeds to step S18. When it is judged in step S17 that the 2nd release switch is turned off, the processing proceeds to step S21.

In step S18, the CPU 216 instructs the lens CPU 106 to drive the diaphragm 1022. Here, in step S18, the instruction is issued so that the diaphragm 1022 is driven to open to an aperture amount (e.g. an open aperture) necessary for the exposure for live-view and the exposure for AF. The processing in steps S17 to S18 may be performed in parallel with the reading of the imaging signal after the main exposure in step S16. Such parallel processing permits the extension of the display time of the live-view image during the main exposure.

In step S19, the CPU 216 performs the exposure operation for live-view, and acquires image data for AF. In this instance, the CPU 216 changes imaging modes of the imager 208. That is, the CPU 216 makes the transition from the imaging mode at a normal frame rate to the imaging mode at a high frame rate (e.g. 120 fps) to repeat the exposure operation for live-view display and the exposure operation for AF. After the transition of the imaging mode, the CPU 216 alternates the exposure operation for live-view with the exposure operation for AF by the imager 208. The number of times of the exposure operations is decided by the intervals of the main exposure in the still image continuous photography, mechanical restrictions of the mechanical shutter 202, and others.

In step S20, the focus detection circuit 222 calculates a defocus direction and a defocus amount with regard to the in-focus position of the focus lens 1021 by the known phase difference method using the pixel data which is acquired from the focus detection pixels whenever the exposure operation for AF ends. The CPU 216 performs live-view display whenever the exposure operation for live-view ends. After the processing in step S20, the processing returns to step S10. The processing for the next main exposure is then performed.

In step S21, the CPU 216 judges whether to turn off the power supply of the camera body 200. For example, when the user operates the operation unit 206 to instruct to turn off the power supply or when the user does not operate the operation unit 206 for a predetermined length of time, the CPU 216 judges that the power supply is to be turned off. When it is judged in step S21 that the power supply of the camera body 200 is not to be turned off, the processing returns to step S1. When it is judged in step S21 that the power supply of the camera body 200 is to be turned off, the processing ends.

Figure 3:
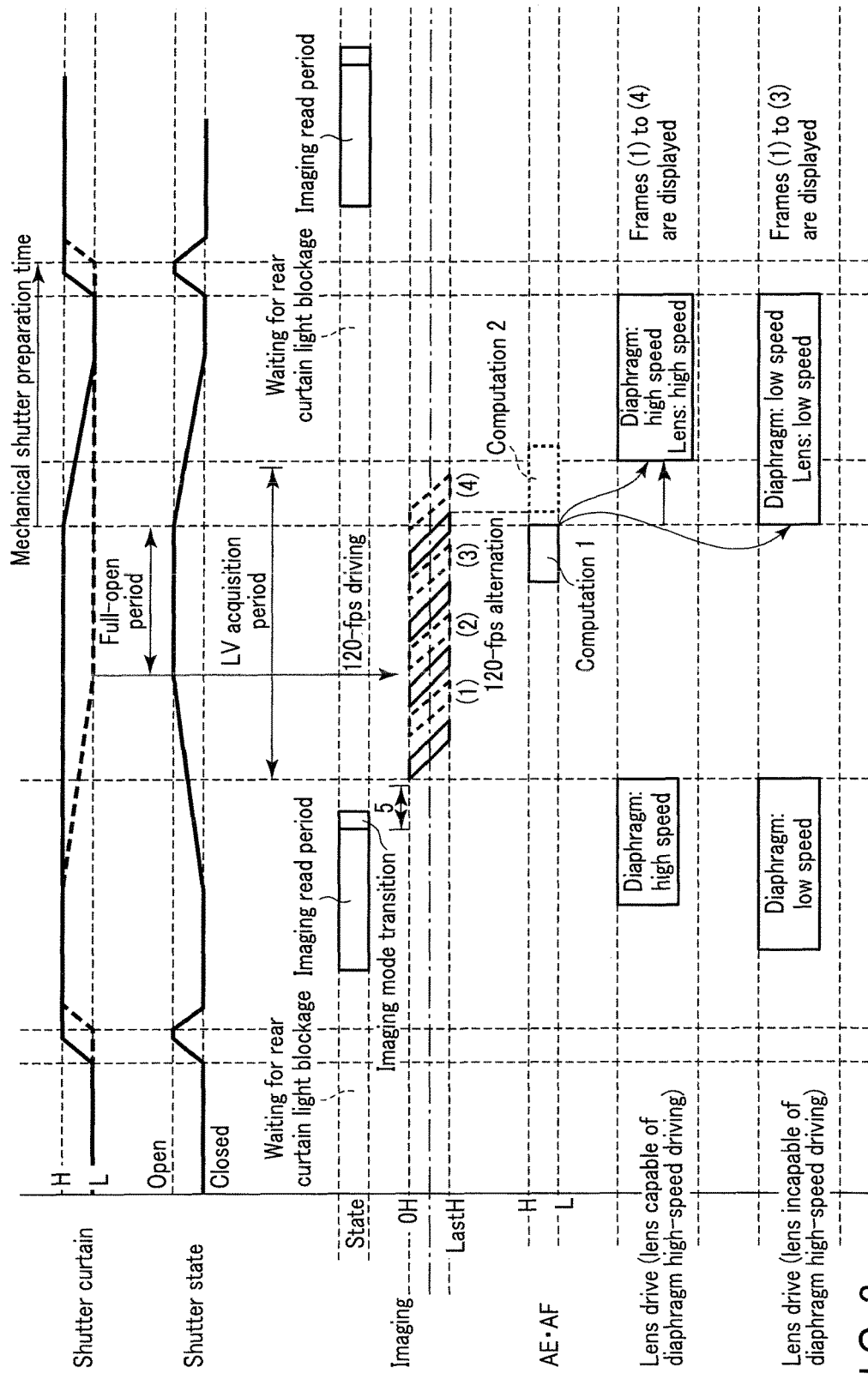
FIG. 3 is a timing chart of the still image continuous photography operation in action.

The still image continuous photography operation is described below in more detail with reference to FIG. 3. FIG. 3 is a timing chart of the still image continuous photography operation in action. In the example shown in FIG. 3, the still image continuous photography is performed 10 frames/s (100 ms per frame). In the example shown here, each of the frame rates of the exposure operation for AF and the exposure operation for live-view is 120 fps.

"Shutter curtain" in the timing chart of FIG. 3 indicates the running states of a front curtain and a rear curtain of the mechanical shutter 202. In FIG. 3, solid lines indicate the running state of the front curtain, and broken lines indicate the running state of the rear curtain. High (H) in the "shutter curtain" indicates that the corresponding shutter curtain has completed running, and low (L) indicates that the corresponding shutter curtain is at an initial position before running.

"Shutter state" in the timing chart of FIG. 3 indicates the open/close state of the whole mechanical shutter 202. In FIG. 3, "open" in "shutter state" indicates that the mechanical shutter 202 is fully open, and "closed" indicates that the mechanical shutter 202 is fully closed.

The top of "imaging" in the timing chart of FIG. 3 indicates the state of the operation of the imager 208. The bottom of "imaging" in the timing chart of FIG. 3 indicates the timing of the reading of an imaging signal for AF and the state of the reading of an imaging signal for live-view. Solid lines indicate the timing of the reading of the imaging signal for AF, and broken lines indicate the timing of the reading of the imaging signal for live-view. OH in each state indicates the read timing of the imaging signal of the first row, and LastH indicates the read timing of the imaging signal of the last row.

"AE●AF" in the timing chart of FIG. 3 indicates the timings of the exposure amount computation for AE and the defocus amount computation for AF.

"Lens drive (lens capable of diaphragm high-speed driving)" in the timing chart of FIG. 3 indicates the timings of the driving of the focus lens 1021 and the diaphragm 1022 of the interchangeable lens 100 including a diaphragm capable of high-speed driving. "Lens drive (lens incapable of diaphragm high-speed driving)" in the timing chart of FIG. 3 indicates the timings of the driving of the focus lens 1021 and the diaphragm 1022 of the interchangeable lens 100 including a diaphragm incapable of high-speed driving.

Immediately before the main exposure, the mechanical shutter 202 is fully closed by the shutter operation processing in step S11. In the following step S16, the CPU 216 performs the main exposure. At the time of the main exposure, the CPU 216 controls the drive unit 204 to run the front curtain and the rear curtain in this order, and the drive unit 204 runs the corresponding shutter curtain. The start timing of the running of the front curtain and the rear curtain is decided by the result of the exposure amount computation for AE, and if this timing is changed, the exposure time of the imager 208 is changed.

During the operation of the mechanical shutter 202, the imager 208 is waiting for rear curtain light blockage. In this instance, the imager 208 performs the exposure operation under the control of the CPU 216. When the running of the rear curtain is completed, the imager 208 is blocked from light. The imaging signal is then read. During or after a predetermined period (an imaging read period in FIG. 3) from the start of the reading of the imaging signal, the CPU 216 controls the drive unit 204 to return the rear curtain to an initial position L of the rear curtain, and the drive unit 204 returns the rear curtain to the initial position L. In parallel with such control of the mechanical shutter 202, the CPU 216 instructs the lens CPU 106 to drive the diaphragm 1022 to a predetermined aperture amount (e.g. an open aperture) in step S18.

When the reading of the imaging signal is completed, the CPU 216 shifts the imaging mode of the imager 208 to the high frame rate (120-fps driving). After the imaging mode is shifted, the CPU 216 starts the exposure operation to alternate the exposure operation for AF with the exposure operation for live-view by the imager 208 when a time (5 ms in the example of FIG. 3) predetermined by the mechanical restrictions of the imager 208, the mechanical shutter 202, and the diaphragm 1022 elapses. After the exposure operation for AF, the focus detection circuit 222 performs the defocus amount computation and the moving object predicting computation. After the exposure operation for live-view, the CPU 216 reads the acquired image data for live-view and then performs live-view display.

After the end of a predetermined period following the return of the rear curtain to the initial position L, the CPU 216 controls the drive unit 204 to move the front curtain to the initial position L, and the drive unit 204 returns the front curtain to the initial position L. This predetermined period is determined by an LV acquisition period and a full-open period. The LV acquisition period is a period to perform the exposure operation for live-view. The full-open period is a period to leave the mechanical shutter 202 fully open. The LV acquisition period and the full-open period are set in accordance with various conditions such as the mechanical restrictions of the focus lens 1021, the diaphragm 1022, the mechanical shutter 202, and the like and the number of continuous photographs required in the still image continuous photography. The full-open period is set as a period in which the exposure operation for AF or the exposure operation for LV can be performed one or more times.

When the diaphragm 1022 is a diaphragm incapable of high-speed driving, the CPU 216 instructs the lens CPU 106 to simultaneously drive the focus lens 1021 and the diaphragm 1022 synchronously with the start of the movement of the front curtain to the initial position L. In contrast, when the diaphragm 1022 is a diaphragm capable of high-speed driving, the CPU 216 instructs the lens CPU 106 to simultaneously drive the focus lens 1021 and the diaphragm 1022 after a predetermined time (e.g. 10 ms) measured by the timer from the start of the movement of the front curtain to the initial position L.

After the completion of the driving of the focus lens 1021 and the diaphragm 1022, the CPU 216 performs the next main exposure. The operation in FIG. 3 is then repeated until the 2nd release switch is turned off.

In the example of FIG. 3, the exposure operation is repeated in the order of the exposure operation for AF and the exposure operation for live-view during the LV acquisition period. The exposure operation for AF precedes the exposure operation for live-view so that the response of AF immediately after the 1st release operation can be improved and the still image continuous photography speed can also be improved.

In the present embodiment, the exposure operation for AF is performed before the mechanical shutter 202 is fully opened, but the defocus amount computation and the moving object predicting computation are performed on the basis of the image data acquired after the mechanical shutter 202 is fully opened. The reason is to prevent lens positions calculated on the basis of more than one image data having different exposure conditions from being mixed in the moving object predicting computation. The exposure operation for AF may be started after the mechanical shutter 202 is fully opened. The image data in the exposure operation for AF before full opening may be used to judge contrast and reliability, and the method of processing image data in the exposure operation for AF acquired after full opening may be changed.

If the image data during the full-open period alone is used to perform the defocus amount computation and the moving object predicting computation, the exposure operation for AF is performed only once during the full-open period in the case of the diaphragm 1022 incapable of high-speed driving in FIG. 3, so that the defocus amount computation can also be performed only once during the main exposure (the timing of Computation 1 in FIG. 3).

In contrast, in the case of the diaphragm 1022 capable of high-speed driving, it is possible to perform one more exposure operation for AF during the period in which the mechanical shutter 202 is substantially fully opened, by delaying the start of the driving of the diaphragm 1022. This permits Computation 2 to be performed by the timing after Computation 1.

FIG. 4 is a graph illustrating the moving object predicting computation in the present embodiment. The horizontal axis in FIG. 4 indicates elapsed time, and the vertical axis in FIG. 4 indicates the change of the lens position. Timings t1, t2, t3, and t4 in FIG. 4 indicate the timings of Computation 1. Timings t1', t2', t3', and t4' in FIG. 4 indicate the timings of Computation 2.

In the case of the diaphragm 1022 incapable of high-speed driving in FIG. 3, the exposure operation for AF is performed only once during one main exposure, so that the defocus amount computation and the moving object predicting computation are also performed only once during the main exposure. Thus, lens positions y1, y2, and y3 obtained in the timings t1, t2, and t3 and a lens position obtained in the timing t4 are used in the moving object predicting computation in Computation 1 of the timing t4. A lens position y4 to be driven to at the time of the main exposure is calculated by the result of Computation 1.

Meanwhile, in the case of the diaphragm 1022 capable of high-speed driving, it is possible to perform two exposure operations for AF during one main exposure. However, in the example of FIG. 3, the drive speed of the diaphragm 1022 is a degree of drive speed that requires the start of driving before the end of Computation 2. Therefore, the lens position obtained in Computation 2 cannot be reflected in the driving of the focus lens 1021 at the moment. The lens position obtained in Computation 2 is used in the next moving object predicting computation in Computation 1. For example, the lens positions y1, y1', y2, y2', y3, and y3' obtained in the timings t1, t1', t2, t2', t3, and t3' and the lens position obtained in the timing t4 are used in the moving object predicting computation in Computation 1 of the timing t4. The lens position y4 to be driven to at the time of the main exposure is calculated by the result of Computation 1. Thus, in the case of the diaphragm capable of high-speed driving, it is possible to increase the lens positions used in the moving object predicting computation. This improves moving object predicting performance.

In the present embodiment, the exposure operation for live-view is performed before the mechanical shutter 202 is fully opened. An image obtained by the exposure operation before the mechanical shutter 202 is fully opened is darker. However, even an image that is a little dark can be used in the framing by the user. Therefore, in the present embodiment, a maximum acquisition period of the live-view image (the LV acquisition period in FIG. 3) can be taken so that the user can easily catch an active subject. In the example of FIG. 3, at least frames (1), (2), and (3) in FIG. 3 can be used in the live-view display.

Furthermore, in the present embodiment, the driving of the diaphragm 1022 is delayed when the diaphragm 1022 capable of high-speed driving includes the interchangeable lens 100. This permits one more exposure operation for live-view to be performed during the period in which the mechanical shutter 202 is substantially fully opened. It is therefore possible to further use a frame (4) in the live-view display.

FIG. 5 is a table showing, by comparison, image loss ratios in the diaphragm capable of high-speed driving and the diaphragm incapable of high-speed driving in the example of FIG. 3. Here, the frame rate for the live-view display is 120 fps. In the case of the diaphragm incapable of high-speed driving, images of the three frames (1), (2), and (3) are acquired by the exposure operation for live-view. In this case, an image display time is (1/120×3)=25 (ms). For example, if the still image continuous photography is performed 10 frames/s, the intervals of the continuous photography is 100 (ms), so that the image loss ratio (the ratio between an inter-frame time and the time in which the live-view display is no longer performed) is 75(%). In contrast, in the case of the diaphragm capable of high-speed driving, images of the four frames (1), (2), (3), and (4) are acquired by the exposure operation for live-view. In this case, an image display time is (1/120×4)=33.3 (ms). For example, if the still image continuous photography is performed 10 frames/s, the image loss ratio is 67(%). Thus, in the present embodiment, the driving of the diaphragm is delayed when the diaphragm is capable of high-speed driving, and the time of the live-view display is thereby extended, so that the image loss ratio can be improved.

As described above, according to the present embodiment, the start of the driving of the diaphragm is controlled in accordance with the drive speed of the diaphragm 1022. This makes it possible to extend the time of the live-view display during the still image continuous photography. The moving object predicting performance during the still image continuous photography can also be improved.

[Modifications]

Modifications of the present embodiment are described below. In the embodiment described above, the CPU 216 delays the start of the driving of the diaphragm 1022 so that the completion of the driving of the diaphragm 1022 may coincide with the start timing of the main exposure. However, the completion of the driving of the diaphragm 1022 does not necessarily have to coincide with the start timing of the main exposure. That is, the CPU 216 may delay the start of the driving of the diaphragm 1022 so that the completion of the driving of the diaphragm 1022 may be earlier than the start timing of the main exposure.

In the example shown in the embodiment described above, the 1-bit flag indicating whether the diaphragm is capable of high-speed driving is stored in the lens-side storage unit 108 as the information on the drive speed of the diaphragm 1022. It is also possible to store information on the actual drive speed of the diaphragm 1022 in the lens-side storage unit 108. For example, the time required to drive from the open aperture (e.g. F2.0) to a predetermined aperture amount (e.g. F8.0 or F16.0) may be stored as the information on the drive speed. In this case, time information corresponding to several typical aperture amounts alone may be recorded, and the intermediate aperture amounts may be acquirable by linear interpolation.

When the information on the actual drive speed of the diaphragm 1022 is stored in the lens-side storage unit 108, the start timing of the driving of the diaphragm 1022 can be set in accordance with the drive speed of the diaphragm 1022. That is, when the time required to drive to the aperture amount obtained by the exposure amount computation is shorter than the time from the completion of the moving object predicting computation to the full closure of the mechanical shutter 202, the start of the driving of the diaphragm 1022 can be delayed by this time difference. For example, the aperture amount obtained by the exposure amount computation is F8.0, and the interchangeable lens 100 includes the diaphragm 1022 that requires 30 ms to drive from the open aperture to F8.0. The operation to fully close the mechanical shutter 202 requires 40 ms. In this instance, the CPU 216 instructs the lens CPU 106 to simultaneously drive the focus lens 1021 and the diaphragm 1022 after the elapse of 10 ms from the start of the driving of the mechanical shutter 202. Thus, if the frame rate of the exposure operation is 120 fps, it is possible to perform an exposure operation for one more frame within 10 ms before the mechanical shutter 202 is fully closed. As a result, it is possible to further extend the LV acquisition period.

The example described above is based on the assumption that the focus lens 1021 and the diaphragm 1022 can be driven at the same speed. Actually, the focus lens 1021 and the diaphragm 1022 can not necessarily be driven at the same speed. In this case, the start timings of the driving of the focus lens 1021 and the diaphragm 1022 are limited by the lower drive speed. For example, it takes 30 ms to drive the focus lens 1021 on the basis of the result of the moving object predicting computation, and it takes 25 ms to drive the diaphragm 1022. If it takes 40 ms for the operation to fully close the mechanical shutter 202 as described above, it is possible to delay the start of driving 15 ms when the diaphragm 1022 alone is driven. However, it is also necessary to secure the driving time of the focus lens 1021, so that the start timing of the driving of the diaphragm 1022 is also delayed 10 ms.

Information on the drive speed of the focus lens is previously stored in, for example, the lens-side storage unit 108. For example, the time required to drive to a predetermined lens position can be stored as the information on the drive speed of the focus lens. A focus lens having a high synchronization frequency can be said to be a highly responsive focus lens. Therefore, by associating the information on the drive speed of the focus lens with the synchronization frequency of the interchangeable lens 100 (the focus lens 1021), it is possible to store the synchronization frequency as the information on the drive speed of the focus lens. For example, the drive speed of the focus lens can be associated with the synchronization frequency of the focus lens as in FIG. 6 in consideration of past and future lens performance and target moving object tracking performance (the length of the live-view display period and the precision of the moving object prediction) for the camera system 1.

Figure 7:
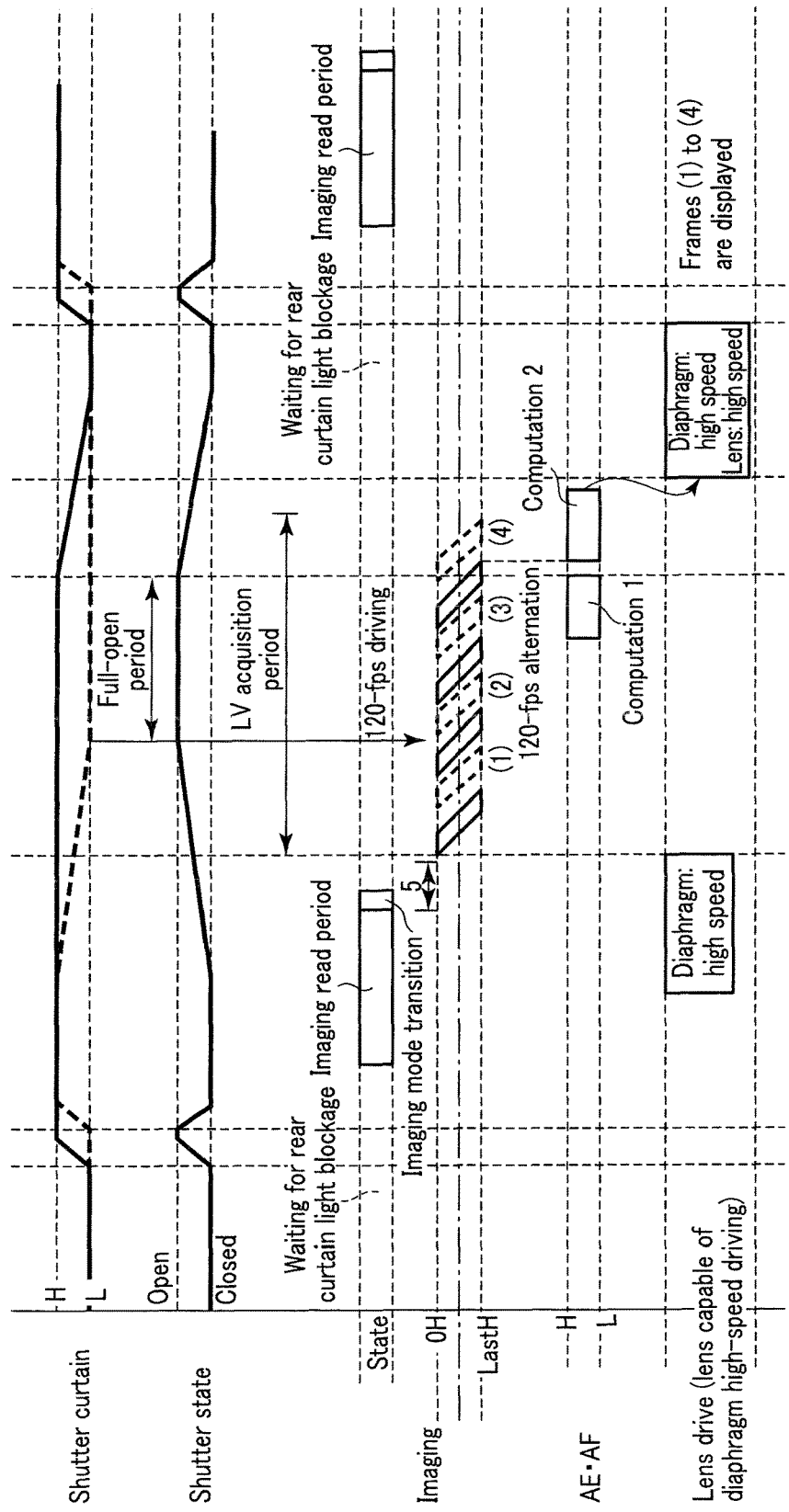
FIG. 7 is a timing chart of the still image continuous photography operation in action in the case where the drive speeds of the focus lens and the diaphragm are high enough.

The driving of the diaphragm 1022 is started before the completion of Computation 2 in the example shown in FIG. 3. When the drive speeds of the focus lens 1021 and the diaphragm 1022 are high enough, simultaneous driving of the focus lens 1021 and the diaphragm 1022 can be started after the completion of Computation 2, as shown in FIG. 7. In this case, as shown in FIG. 8, the moving object predicting computation can be performed by the timing of Computation 2. This further improves moving object predicting performance.

Figure 9:
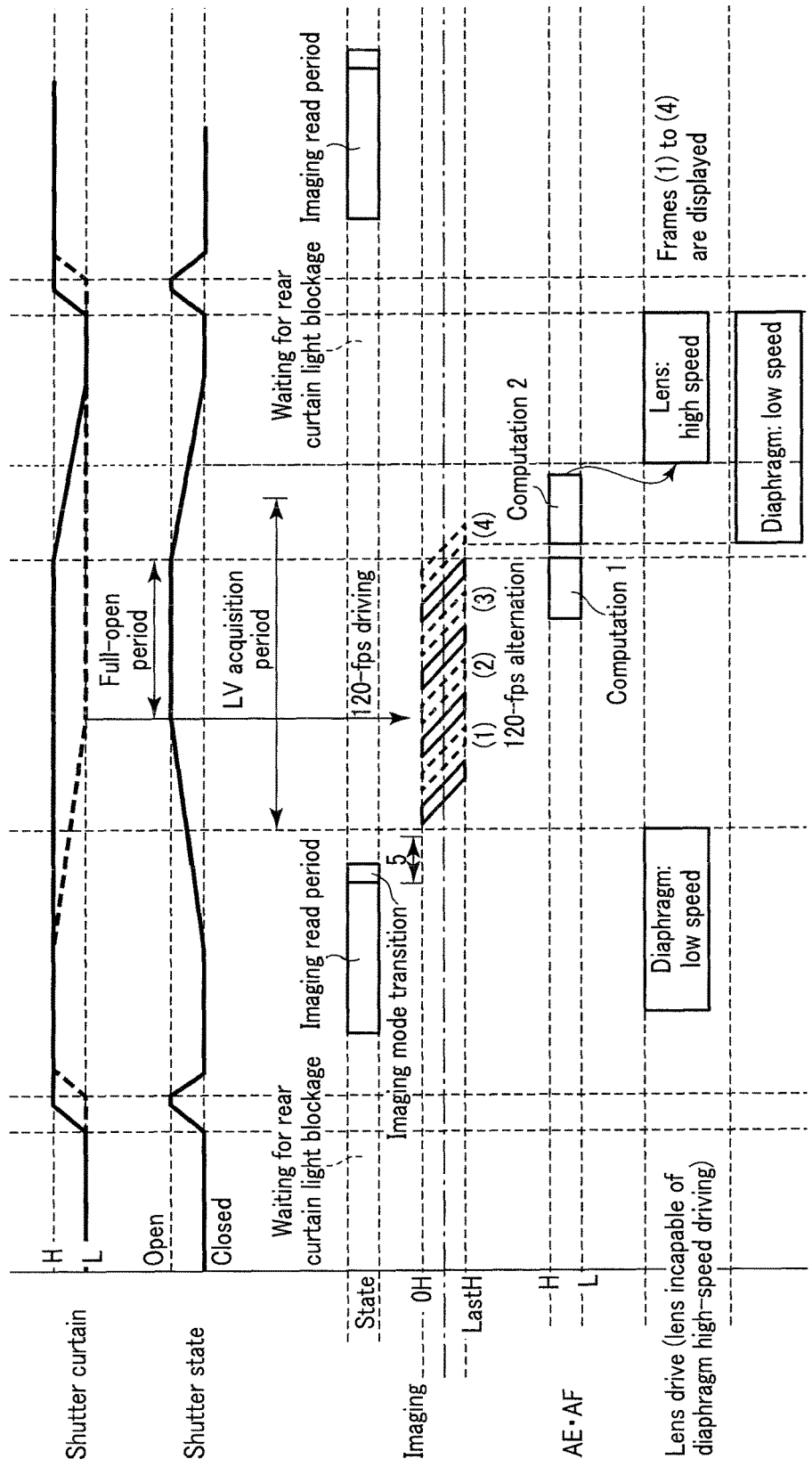
FIG. 9 is a timing chart of the still image continuous photography operation in action in the case where the drive speed of the focus lens is high and the drive speed of the diaphragm is low.

The focus lens 1021 and the diaphragm 1022 are simultaneously driven in the example shown in FIG. 3 and FIG. 7. However, the focus lens 1021 and the diaphragm 1022 do not necessarily have to be simultaneously driven. For example, when the drive speed of the focus lens 1021 is high and the drive speed of the diaphragm 1022 is low, the start timing of the driving of the focus lens 1021 alone may be delayed as shown in FIG. 9. If the driving of the focus lens 1021 can be started after the completion of Computation 2 as in FIG. 9, the moving object predicting computation can be performed by the timing of Computation 2. Although the closing of the mechanical shutter 202 is started by the timing of the frame (4) in the example of FIG. 9, even an image that is a little dark can be used in the framing by the user as described above. Therefore, the image of the frame (4) can also be used in the live-view display.

In the example described above, the exposure operation for AF and the reading of the imaging signal alternate with the exposure operation for live-view and the reading of the imaging signal frame by frame. In contrast, the technique according to the present embodiment is also applied to the case where the imaging mode of the imager 208 is a second half read mode. The second half read mode is an imaging mode in which, as shown in FIG. 10, the exposure operation for AF and the exposure operation for live-view are simultaneously performed row by row in one frame, the imaging signal for AF is read in the first half of each horizontal period, and the imaging signal for live-view is read in the second half of each horizontal period. Even in the example of FIG. 10, it is possible to respectively increase the numbers of exposure operations for AF and live-view by one, by delaying the start timing of the driving of the focus lens 1021. In FIG. 10, the diaphragm 1022 is a diaphragm incapable of high-speed driving. If the diaphragm 1022 is a diaphragm capable of high-speed driving, the start timing of the driving of the diaphragm 1022 may also be delayed.

In the example described above, the drive speed of the diaphragm 1022 is not variable. In contrast, the technique according to the present embodiment is also applied to an example in which the interchangeable lens 100 includes the diaphragm 1022 that allows its drive speed to be switched from a low speed (normal) to a high speed. Such a diaphragm 1022 is driven at the low speed, for example, in a photography waiting state before the 1st release switch is turned on. This reduces the driving noise of the diaphragm 1022 in the photography waiting state.

Figure 11A:
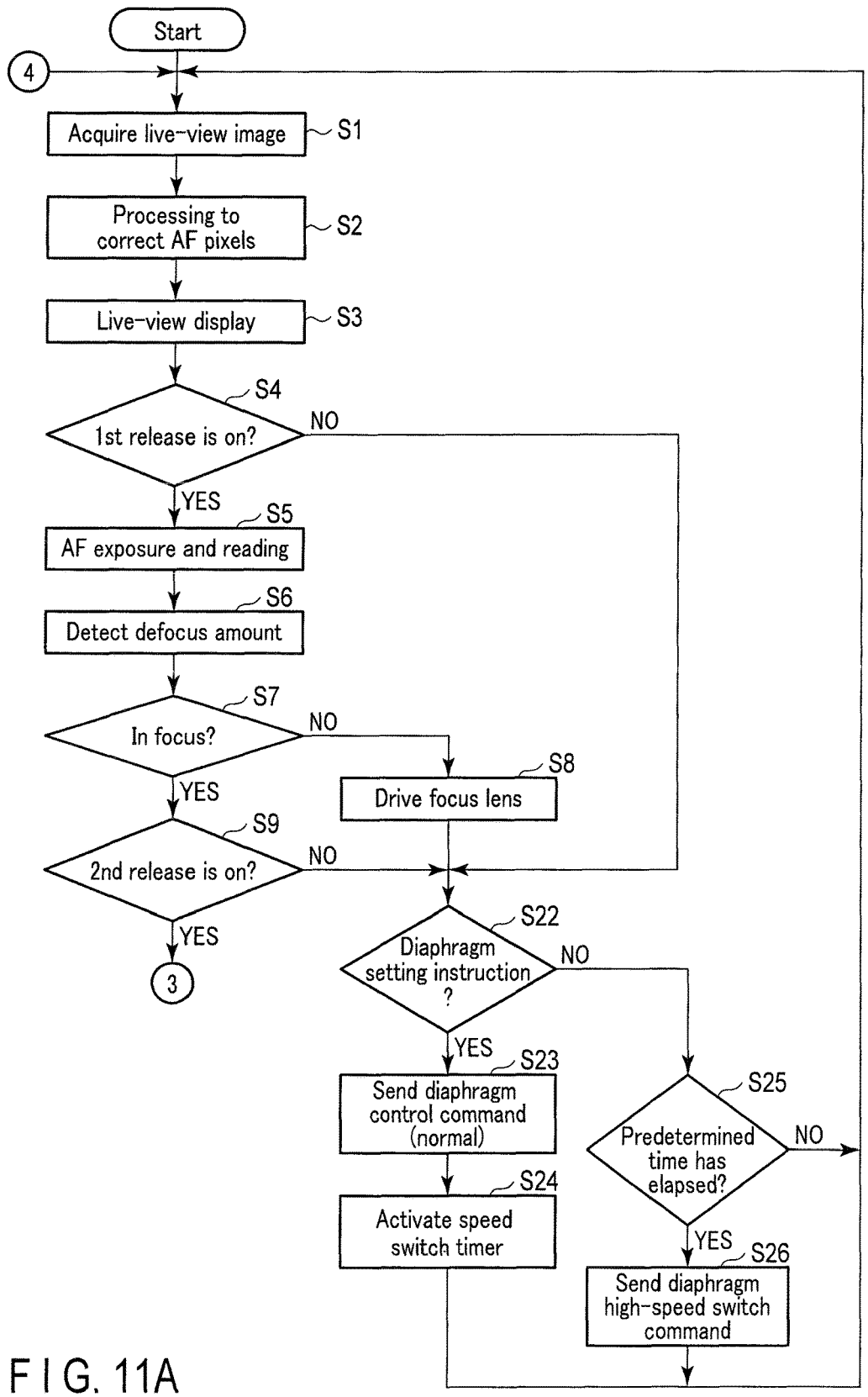
FIG. 11A is a flowchart showing the still image continuous photography operation by a camera system including a diaphragm in which the drive speed can be switched.
Figure 11B:
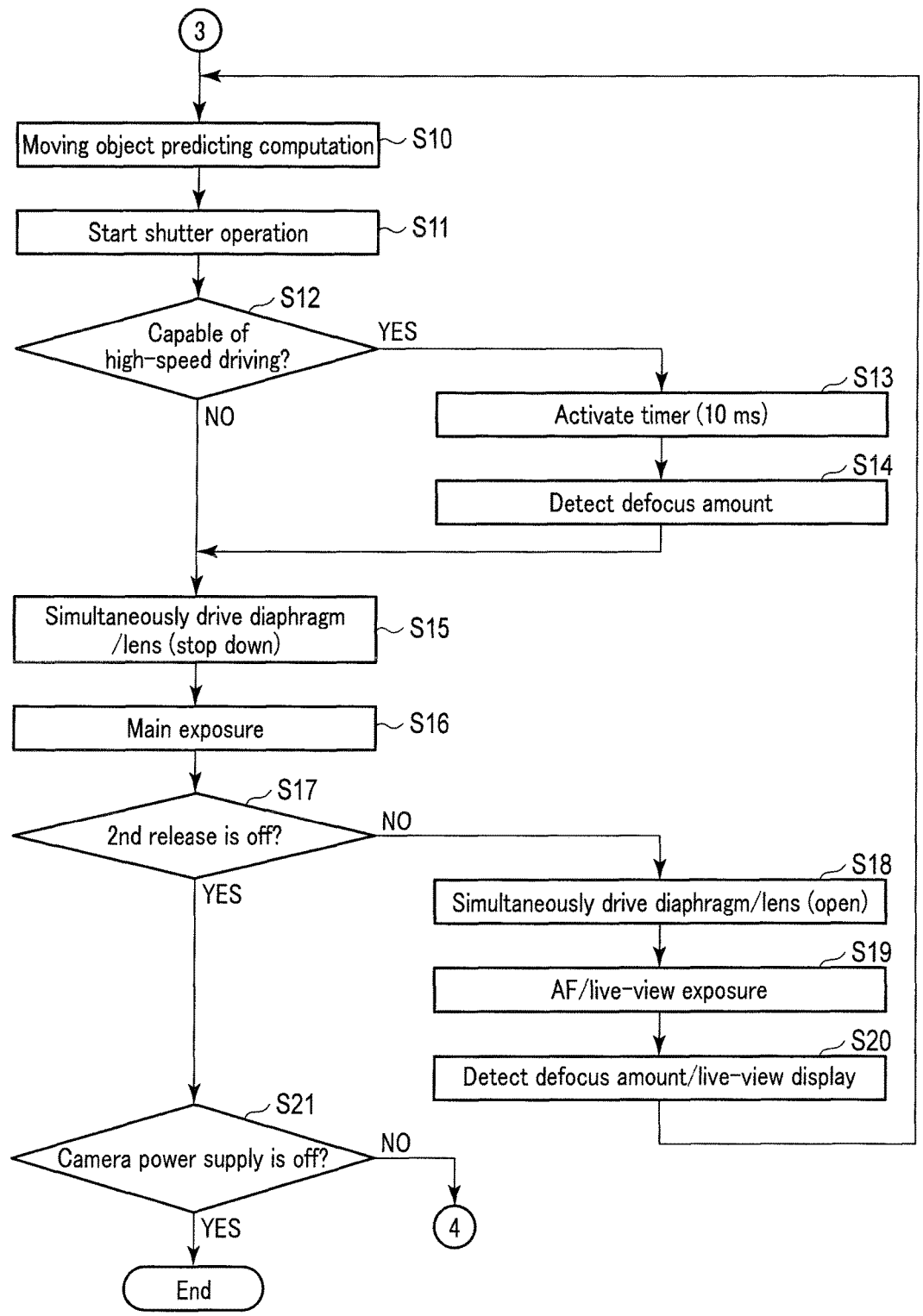
FIG. 11B is a flowchart showing the still image continuous photography operation by the camera system including the diaphragm in which the drive speed can be switched.

FIG. 11A and FIG. 11B are flowcharts showing the still image continuous photography operation by the camera system including the diaphragm 1022 in which the drive speed can be switched. In FIG. 11A and FIG. 11B, the same processes as those in FIG. 2A and FIG. 2B are provided with the same step numbers as those in FIG. 2A and FIG. 2B and are thus not described. That is, FIG. 11A and FIG. 11B are different from FIG. 2A and FIG. 2B in that the processes in steps S22 to S26 are performed in the case of NO in step S4 and in the case of NO in step S9. Therefore, the processes in steps S22 to S26 are only described below.

In step S22, the CPU 216 judges whether to issue a diaphragm setting instruction. It is judged in step S22 that the diaphragm setting instruction is issued when the diaphragm 1022 needs to be driven at the normal speed. When it is judged in step S22 that the diaphragm setting instruction is issued, the processing proceeds to step S23. When it is judged in step S22 that the diaphragm setting instruction is not issued, the processing proceeds to step S25.

In step S23, the CPU 216 issues a diaphragm control command to the lens CPU 106 to drive the diaphragm 1022 at the normal speed. Thus, the lens CPU 106 drives the diaphragm 1022 at the normal speed.

In step S24, the CPU 216 activates a speed switch timer. The timer here is a timer which measures a predetermined time (e.g. a time of 10 frames of the exposure operation for live-view). The setting of the timer is suitably changed. After the activation of the speed switch timer, the processing proceeds to step S1.

In step S25, the CPU 216 judges whether the predetermined time has elapsed since the activation of the timer. When it is judged in step S25 that the predetermined time has not elapsed since the activation of the timer, the processing proceeds to step S1. When it is judged in step S25 that the predetermined time has elapsed since the activation of the timer, the processing proceeds to step S26.

In step S26, the CPU 216 issues a diaphragm high-speed switch command to the lens CPU 106. When instructed from the CPU 216 to asynchronously drive the diaphragm 1022 after receiving the diaphragm high-speed switch command, the lens CPU 106 drives the diaphragm 1022 at the high-speed. After the diaphragm high-speed switch command is sent in step S26, the processing proceeds to step S1.

FIG. 12 is a diagram illustrating processing in steps S22 to S26. FIG. 12 shows, from the top, the state of the 1st release switch, the state of the 2nd release switch, the timing of the main exposure, the drive speed at the time of diaphragm driving, and the states of the commands to the lens CPU 106. Of the commands to the lens CPU 106, the diaphragm control command is indicated by a thin line, and the speed switch command is indicated by a heavy line.

In FIG. 12, in the photography waiting state in which the 1st release switch is turned off, the diaphragm 1022 is driven at the normal speed. For example, if processing interrupts by the turning on of the 1st release switch, the diaphragm high-speed switch command is sent to the lens CPU 106 after the predetermined time from the issuance of the diaphragm control command. In this instance, the diaphragm 1022 is driven at a high speed before and after the main exposure following the turning on of the 2nd release switch. In contrast, if the 2nd release switch is not turned on, the processing returns to step S1, so that the diaphragm 1022 is driven at the normal speed when needed.

In the processing in FIG. 12, the diaphragm high-speed switch command can be issued before the turning on of the 2nd release switch that does not affect a release time lag. Thus, it is no longer necessary to issue the diaphragm high-speed switch command to the lens CPU 106 immediately after the turning on of the 2nd release switch. As a result, it is possible to reduce the release time lag resulting from the issuance of the diaphragm high-speed switch command to the lens CPU 106 immediately after the turning on of the 2nd release switch.

Each process according to the embodiment described above can be stored as a program executable by the CPU 216. Otherwise, each process can be stored and distributed in a storage medium of an external storage device such as a memory card, a magnetic disk, an optical disk, or a semiconductor memory. The CPU 216 then reads the program stored in the storage medium of the external storage device, and can execute the above-described processes when the operation of the CPU 216 is controlled by the read program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
    a photographic lens;
    an imager configured to receive light fluxes passing through the photographic lens to generate an imaging signal;
    a diaphragm configured to regulate the light fluxes passing through the photographic lens and received by the imager;
    a drive unit configured to drive the diaphragm; and
    a control processor configured to perform still image continuous photography and display a live-view image on a display unit during each main exposure of the still image continuous photography,
    wherein the control processor is further configured to control, in accordance with a drive speed of the diaphragm, a start timing of the driving of the diaphragm for the main exposure performed by the drive unit while the live-view image is displayed during each main exposure of the still image continuous photography, delay the start timing of the driving of the diaphragm when the drive speed of the diaphragm is higher than a predetermined value, and perform an exposure operation for the live-view image by the imager by the delayed start timing of the driving of the diaphragm,
    wherein the predetermined value is the drive speed of the diaphragm corresponding to a time necessary for an exposure operation for the live-view image of one frame, and
    the time which delays the start timing of the driving of the diaphragm is longer than the time necessary for the exposure operation for the live-view image of one frame.

2. The imaging apparatus according to claim 1, wherein the control processor is further configured to control the start timing of the driving of the diaphragm so that the driving of the diaphragm is completed in conformity to the start timing of the main exposure or by a timing earlier than the start timing of the main exposure.

3. The imaging apparatus according to claim 1, wherein the photographic lens includes a focus lens,
    the control processor is further configured to control an exposure operation for autofocus which is performed during the still image continuous photography by operating the imager, control a movement of the focus lens on the basis of image data acquired by the exposure operation for autofocus, and control a start of the movement of the focus lens in accordance with the start timing of the control operation of the diaphragm.

4. The imaging apparatus according to claim 3, wherein the control processor is further configured to alternate the exposure operation for the live-view image with the exposure operation for autofocus.

5. The imaging apparatus according to claim 3, wherein the control processor is further configured to perform the exposure operation for the live-view image and the exposure operation for autofocus in the same frame.

6. The imaging apparatus according to claim 1, wherein the diaphragm is configured so that the drive speed thereof is changeable, and
    the control processor is further configured to instruct to change the drive speed of the diaphragm before instructing to start the main exposure by a photographer.

7. The imaging apparatus according to claim 1, wherein the photographic lens and the diaphragm are provided in a lens unit,
    the lens unit further comprising
    a storage unit to store information regarding the drive speed of the diaphragm, and
    a lens communication unit which communicates with the control unit, and
    the control processor is further configured to acquire the information regarding the drive speed of the diaphragm from the storage unit via the lens communication unit.

8. The imaging apparatus according to claim 7, wherein the information regarding the drive speed of the diaphragm is information indicating a speed higher or lower than a predetermined value or information indicating a driving time corresponding to a predetermined amount of driving of the diaphragm.

9. The imaging apparatus according to claim 7, wherein the lens unit further comprises
a focus lens, and
a focus lens control unit which controls a movement of the focus lens,
the control processor is further configured to control an exposure operation for autofocus which is performed during the still image continuous photography by operating the imager, control the movement of the focus lens via the focus lens control unit on the basis of image data acquired by the exposure operation for autofocus, and instruct the focus lens control unit via the lens communication unit to start the movement of the focus lens in accordance with the start timing of the control operation of the diaphragm.

10. A control method of an imaging apparatus, the imaging apparatus comprising a photographic lens, an imager which receives light fluxes passing through the photographic lens to generate an imaging signal, a diaphragm which regulates the light fluxes passing through the photographic lens and received by the imager, and a display unit which displays on the basis of the imaging signal, the control method comprising:
performing still image continuous photography by the imager, and displaying a live-view image on the display unit during each main exposure of the still image continuous photography; and
controlling, in accordance with a movement speed of the diaphragm, a start timing of the movement of the diaphragm for the main exposure while the live-view image is displayed during each main exposure of the still image continuous photography,
wherein controlling the start timing of the movement of the diaphragm comprises delaying the start timing of the movement of the diaphragm when the movement speed of the diaphragm is higher than a predetermined value which is the movement speed of the diaphragm corresponding to a time necessary for an exposure operation for the live-view image of one frame, and
wherein the time which delays the start timing of the movement of the diaphragm is longer than the time necessary for the exposure operation for the live-view image of one frame.

11. The control method according to claim 10, wherein controlling the start timing of the movement of the diaphragm comprises controlling the start timing of the movement of the diaphragm so that the movement of the diaphragm is completed in conformity to the start timing of the main exposure or by a timing earlier than the start timing of the main exposure.

12. The control method according to claim 10, wherein the photographic lens includes a focus lens,
the control method further comprising controlling an exposure operation for autofocus which is performed during the still image continuous photography by operating the imager, and controlling a movement of the focus lens on the basis of image data acquired by the exposure operation for autofocus, and
the movement of the focus lens being started in accordance with the start timing of the movement of the diaphragm.

13. The control method according to claim 12, wherein the exposure operation for the live-view image alternates with the exposure operation for autofocus.

14. The control method according to claim 12, wherein the exposure operation for the live-view image and the exposure operation for autofocus are performed in the same frame.

15. The control method according to claim 10, wherein the diaphragm is configured so that the drive speed thereof is changeable, and
the control method further comprising changing the drive speed of the diaphragm before instructing to start the main exposure by a photographer.

16. A non-transitory computer-readable medium storing a processor executable code, which when executed by at least one processor, performs a control method of an imaging apparatus comprising a photographic lens, an imager which receives light fluxes passing through the photographic lens to generate an imaging signal, a diaphragm which regulates the light fluxes passing through the photographic lens and received by the imager, and a display unit which displays on the basis of the imaging signal, the control method comprising:
performing still image continuous photography by the imager, and displaying a live-view image on the display unit during each main exposure of the still image continuous photography; and
controlling, in accordance with a movement speed of the diaphragm, a start timing of the movement of the diaphragm for the main exposure while the live-view image is displayed during each main exposure of the still image continuous photography,
wherein controlling the start timing of the movement of the diaphragm comprises delaying the start timing of the movement of the diaphragm when the movement speed of the diaphragm is higher than a predetermined value which is the movement speed of the diaphragm corresponding to a time necessary for an exposure operation for the live-view image of one frame, and
wherein the time which delays the start timing of the movement of the diaphragm is longer than the time necessary for the exposure operation for the live-view image of one frame.

* * * * *